No. 850,810. PATENTED APR. 16, 1907.
J. S. WORTH & W. F. HARRISON.
TUBE OR BAR STRAIGHTENING MACHINE.
APPLICATION FILED FEB. 14, 1906.

6 SHEETS—SHEET 1.

No. 850,810. PATENTED APR. 16, 1907.
J. S. WORTH & W. F. HARRISON.
TUBE OR BAR STRAIGHTENING MACHINE.
APPLICATION FILED FEB. 14, 1906.

6 SHEETS—SHEET 2.

Witnesses:
Titus H. Gove.
Hamilton D. Turner.

Inventors,
John S. Worth.
William F. Harrison.
by their Attorneys,
Howson Howson No. 850,810. PATENTED APR. 16, 1907.
J. S. WORTH & W. F. HARRISON.
TUBE OR BAR STRAIGHTENING MACHINE.
APPLICATION FILED FEB. 14, 1906.

6 SHEETS—SHEET 3.

Witnesses
Titus N Grous.
Hamilton D. Turner

Inventors,
John S. Worth.
William F. Harrison
by their Attorneys
Howson & Howson

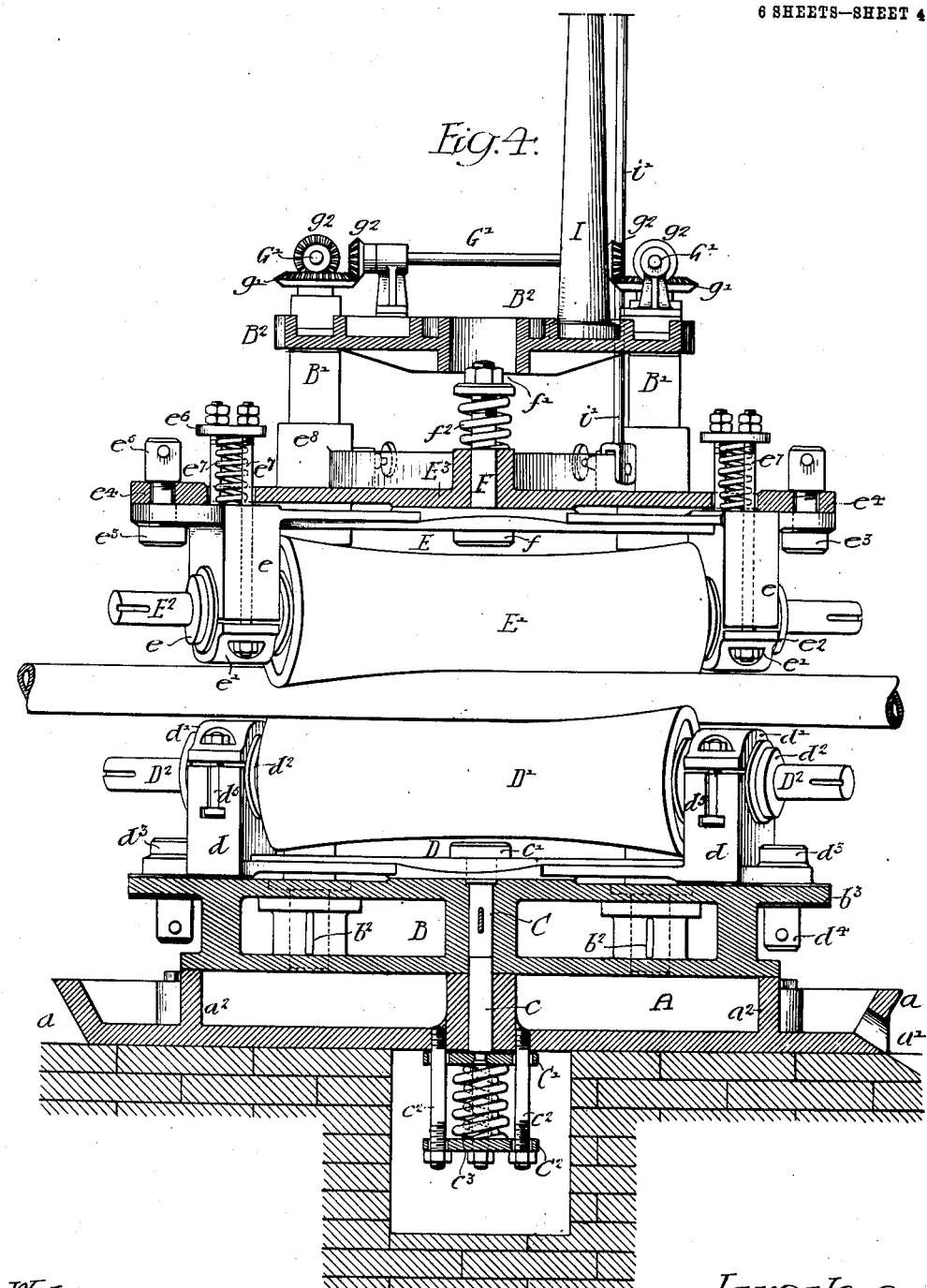

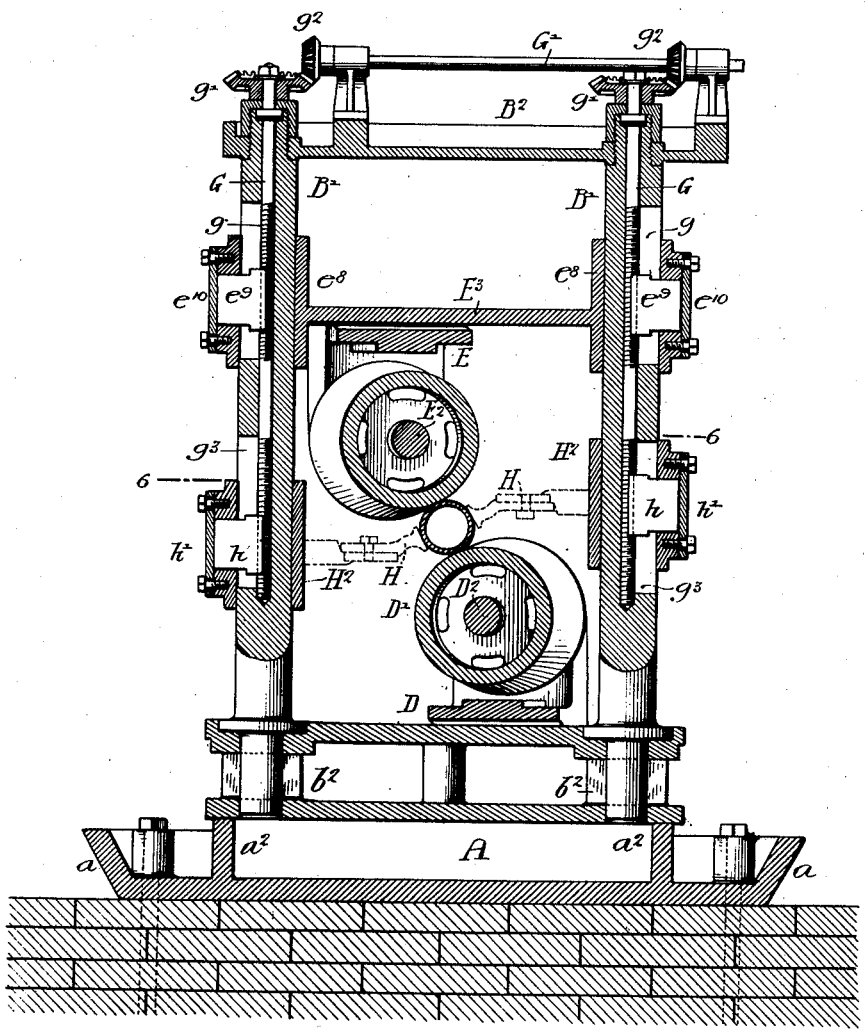

No. 850,810. PATENTED APR. 16, 1907.
J. S. WORTH & W. F. HARRISON.
TUBE OR BAR STRAIGHTENING MACHINE.
APPLICATION FILED FEB. 14, 1906.
6 SHEETS—SHEET 6.
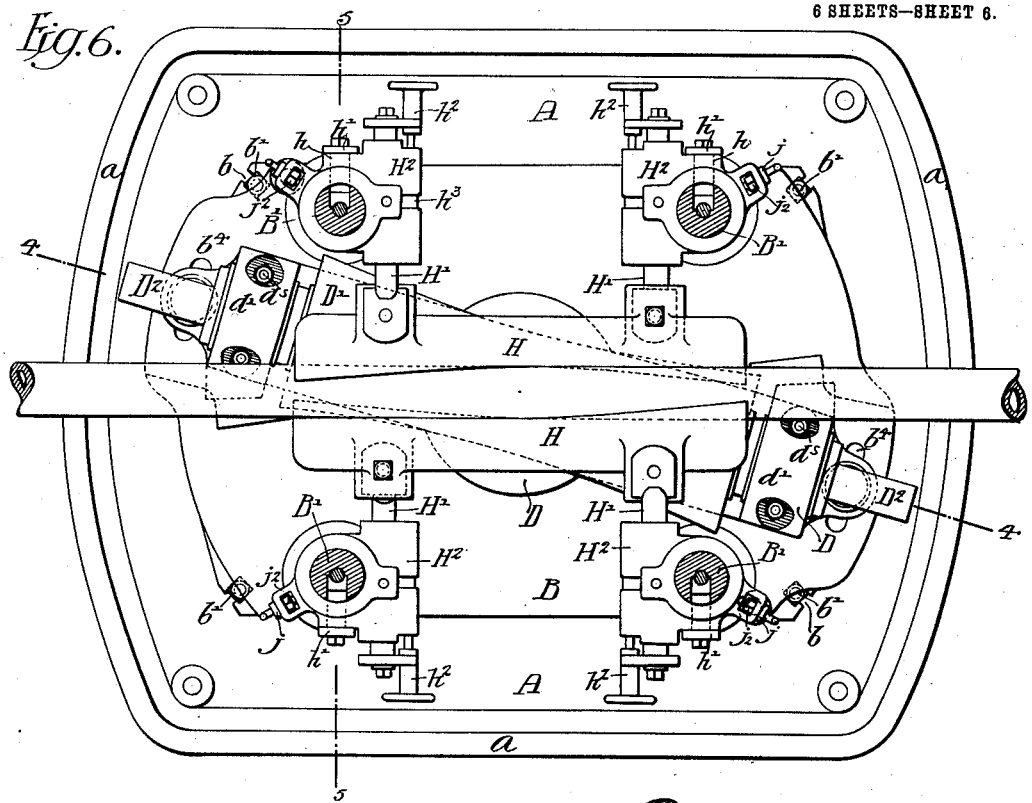
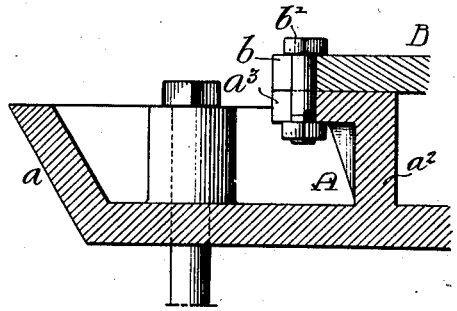
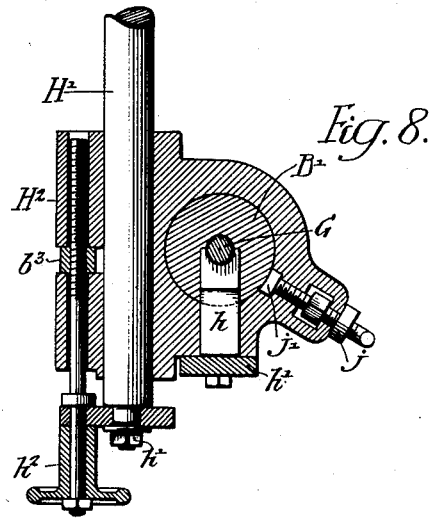
Witnesses:
Inventors:
John S. Worth.
William F. Harrison.
by their Attorneys:

UNITED STATES PATENT OFFICE.

JOHN S. WORTH AND WILLIAM F. HARRISON, OF COATESVILLE, PENNSYLVANIA, ASSIGNORS TO SAID JOHN S. WORTH AND WILLIAM P. WORTH, OF COATESVILLE, PENNSYLVANIA.

TUBE OR BAR STRAIGHTENING MACHINE.

No. 850,810.　　　Specification of Letters Patent.　　Patented April 16, 1907.

Application filed February 14, 1906. Serial No. 301,105.

*To all whom it may concern:*

Be it known that we, JOHN S. WORTH and WILLIAM F. HARRISON, citizens of the United States, residing at Coatesville, Pennsylvania, have invented certain Improvements in Tube or Bar Straightening Machines, of which the following is a specification.

Our invention relates to certain improvements in machines of the type in which a tube or bar has been straightened after it has been formed and welded.

Our invention particularly relates to that class of straightening-machines in which the tube or bar is passed between a pair of specially-shaped rolls substantially in line with the axis of the rolls. Heretofore in this class of machines it was impossible to turn the rolls end for end without taking them out of their bearings, when one end would wear to a greater extent than the other and it was very difficult to make any adjustments.

The main object of our invention is to so construct a tube or bar straightening machine that the rolls can be readily turned end for end, that the rolls can be adjusted quickly one in respect to the other, and simultaneously with this adjustment of the rolls the side guides can be also adjusted.

A further object of the invention is to so mount the rolls that they will not chatter, insuring the proper straightening of the tube.

Figure 1:
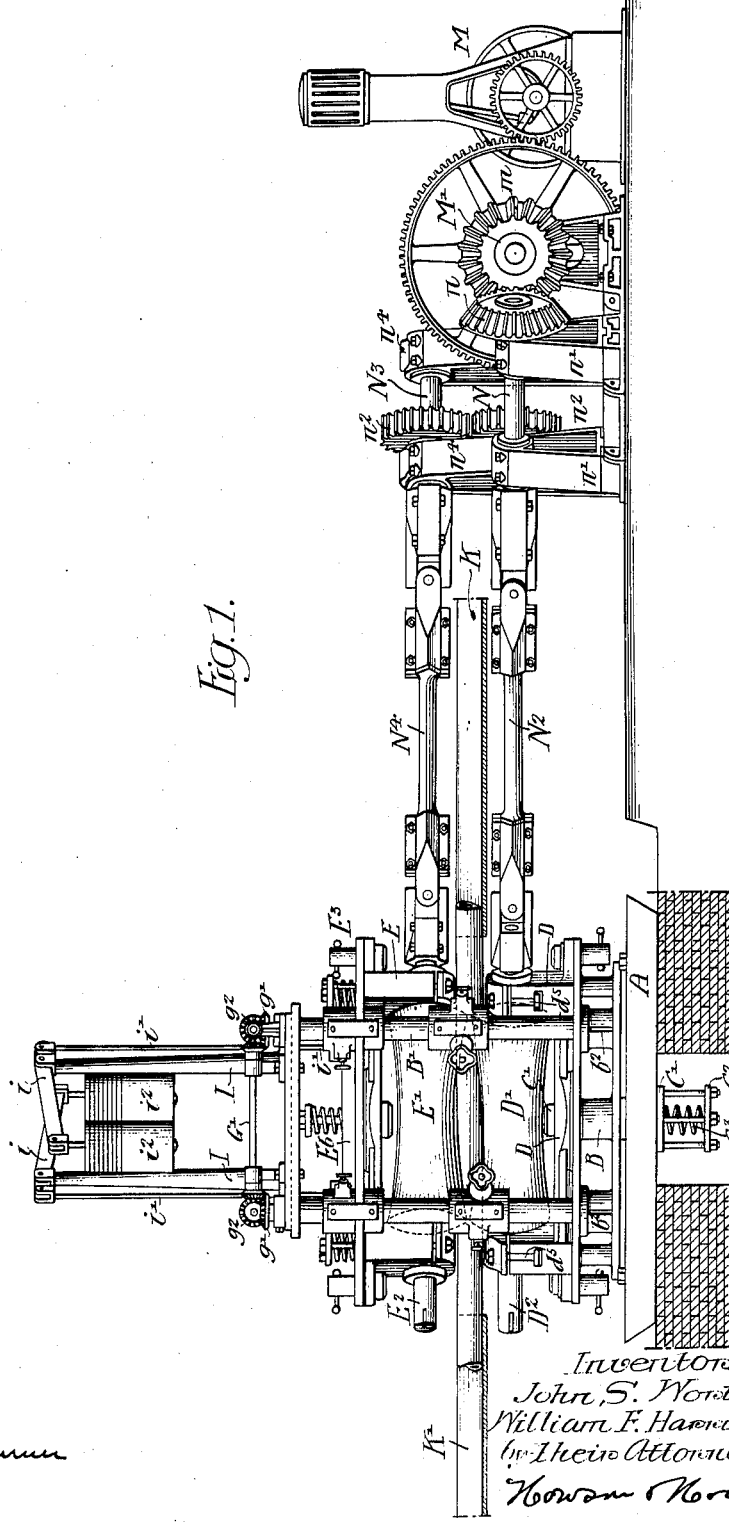
Figure 2:
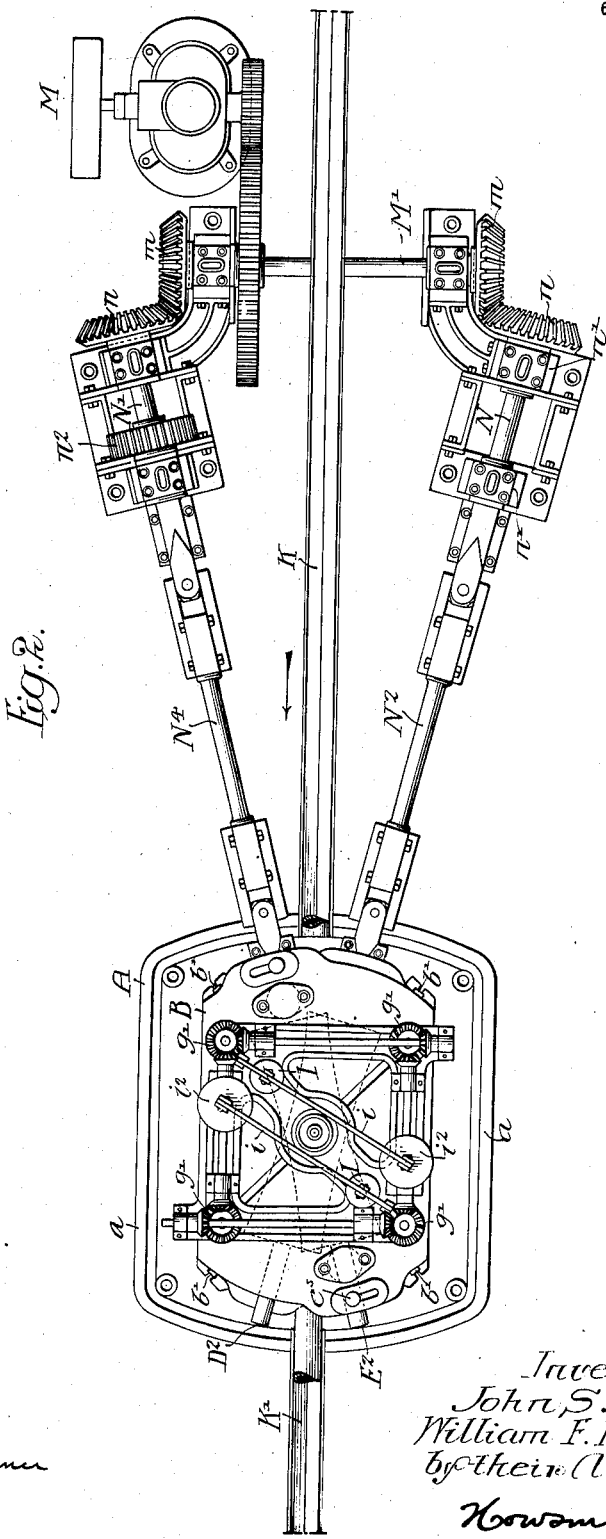
Figure 3:
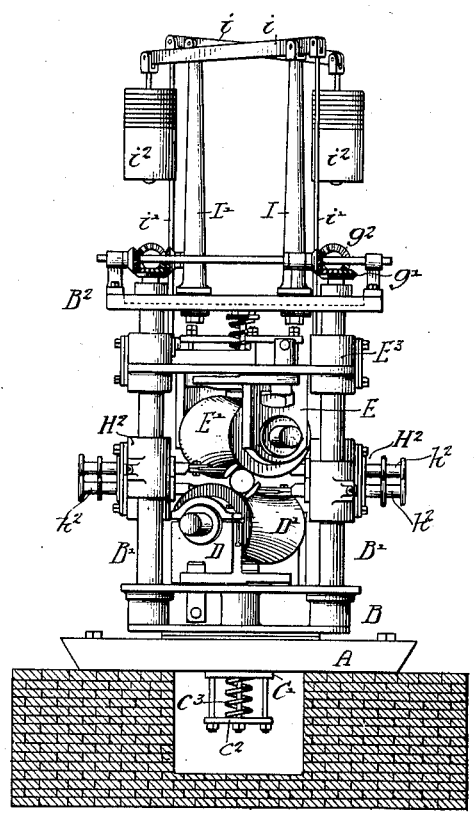
Figure 9:
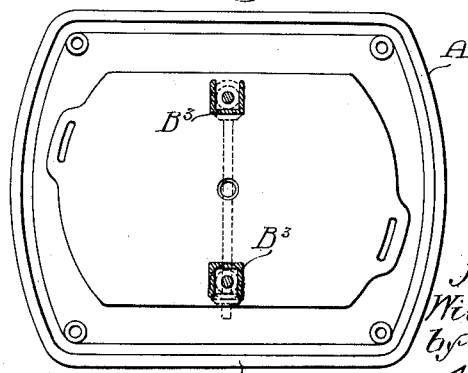

Referring to the accompanying drawings, Figure 1 is a side view of our improved tube-straightening machine. Fig. 2 is a plan view. Fig. 3 is an end view. Fig. 4 is a vertical sectional view on the line 4 4, Fig. 6. Fig. 5 is a vertical sectional view on the line 5 5, Fig. 6. Fig. 6 is a sectional plan view on the line 6 6, Fig. 5. Figs. 7 and 8 are sectional views of details of the invention, and Fig. 9 is a modification, showing two standards instead of the four illustrated in the other figures of the drawings.

A is the base of the machine mounted on a suitable foundation, as clearly illustrated in the drawings. This base has a flange $a$, extending around the edge, so as to collect the water and scale dropping from the machine, and this water and scale passes out through an opening $a'$ in the flange. Supported on a rib $a^2$, projecting from the base-plate A, is a bed-plate B, carrying the entire mechanism of the machine. This bed-plate is pivoted at the center to the base. In the present instance a pin $c$ extends through the base-plate and into the bed-plate. The pin $c$ abuts against the end of a pivot-pin C, keyed to the bed-plate, as shown in Fig. 4. The pin $c$ is carried by a plate $C'$, situated in a pit under the base-plate and guided in the present instance by small studs $c^2$, which carry at their lower ends a plate $C^2$, which can be adjusted by turning the nuts on the studs $c^2$. Mounted between the plates $C^2$ and $C'$, in the present instance, are two coiled springs $c^3$, which are of such strength as to nearly counterbalance the weight of the entire mechanism carried by the bed-plate, so that the machine can be readily turned end for end without trouble. The plate $C^2$ can be adjusted on the studs $c^2$, as desired.

The rib $a^2$ is curved at each end to correspond to the curve of the outer flange and at each corner is an overhanging flange $a^3$, Fig. 7, and these flanges are slotted for the reception of a confining-bolt $b'$. The flange $b$ on the bottom of the bed-plate B is also slotted for the reception of this confining-bolt. In the present instance the slots are at each corner of the machine and four bolts are used to secure the bed-plate to the base, so that on removing these four bolts and uncoupling the rolls from the driving mechanism the entire machine can be swung around end for end.

Extending vertically from the bed-plate in the present instance are four cylindrical standards B', connected together at their upper end by a top plate B². The standards are secured to the bed-plate by keys $b^2$, and their upper ends are threaded and arranged to be screwed into threaded openings in the top plate B²; but other means of fastening the standards to the plates may be used without departing from our invention.

D is a saddle for the lower roll D'. This saddle is pivoted to the bed-plate B by a pivot-pin C, having a head $c'$, so that the saddle can be swung on its pivot. The saddle D has boxes $d\ d$ at each end provided with caps $d'$, and mounted in the boxes are the bearings $d^2$ for the axle D², on which is secured the roll D'. The saddle D extends beyond the boxes, and bolts $d^3$ pass through openings in the saddle and through slots in the flange $b^3$ of the bed-plate, as clearly illustrated in Fig. 6. These slots $b^4$ are of sufficient length to allow for a limited swing of the lower saddle on the bed-plate; but this adjustment is sufficient for all purposes. In the present instance there is a nut $d^4$, screwed onto the end of the bolt $d^3$, and this nut is provided with a slide-handle, so that it can be readily turned without the use of a wrench. This construction is clearly illustrated in Figs. 1 and 4. The cap $d'$ of each bearing is held firmly to the bearing by bolts $d^5$, and as the saddle is firmly secured to the bed-plate and the weight of the roll is sufficient to keep it in position there is no possibility of the lower roll chattering.

$E'$ is the upper roll carried by the shaft $E^2$, which is mounted in bearings $e^2$, carried by the boxes $e\ e$ and caps $e'$. The boxes $e\ e$ project from the upper saddle E, hung to a frame $E^3$ by a pivot-bolt F, having a head $f$. Between a nut $f'$ on the bolt F and the frame E is a spring $f^2$, which tends to keep the saddle up against the frame $E^3$, the spring being heavy enough to overbalance the weight of the saddle E and the roll $E'$.

The saddle E projects beyond the boxes $e\ e$ similar to the saddle D, and bolts $e^3$ pass through the saddle and into slots $e^4$ in the frame $E^3$. Thus the saddle E can be turned on the pivot-bolt to an extent limited by the length of the slots and locked by the bolts $e^3$ and nuts $e^5$. These nuts are provided with slip-handles, so that they can be turned without the use of wrenches.

In order to support the rolls $E'$ in the boxes E, we extend the bolts $e^7$, which confine the boxes to the saddle, entirely through the saddle and through a plate $e^6$ and mount a spring between each plate and the saddle, the springs being heavy enough to overbalance the weight of the roll $E'$. The bolts and the springs extend through slots in the frame $E^3$, as clearly shown in Fig. 4. By the use of the springs we overbalance the weight of the rolls and saddle, and thus are enabled to prevent the chattering of the upper roll.

When a tube or bar is passed through the mill, the rolls will not chatter, and consequently a more accurate straightening of the tube or bar is effected than in the old type of machine.

The frame $E^3$ has bosses $e^8$ at each side, through which pass the four standards $B'$. The frame snugly fits these standards, so that it can accurately slide thereon when it is desired to raise or lower the frame. Extending into each standard is a screw-shaft G, and carried by each of the bosses of the frame $E^3$ is a block $e^9$ in the form of a half-nut, which meshes with the thread $g$ of the screw. Each block is held in position in the present instance by a plate $e^{10}$, Fig. 5. The screws G extend through the upper end of the standards and are provided with beveled gear-wheels $g'$, which mesh with bevel-pinions $g^2$ on shafts $G'$. The end of one of these shafts $G'$ is extended and is squared for the reception of a wrench. When the wrench is applied and the shaft is turned, all four of the vertical screw-shafts turn in unison, and as these shafts mesh with nuts carried by the frame $E^3$ the frame and its roll $E'$ will be raised or lowered according to the direction of movement of the screw-shafts. Other mechanism for turning the screws in unison may be used, if desired.

Mounted between the upper and lower rolls at each side of the tubeway are guide-plates H H, Fig. 6, which are carried by bars $H'$, mounted in boxes $H^2$, arranged to slide on the standards $B'$. These boxes are slotted for the reception of blocks $h\ h$, having half-nuts, which mesh with screw-threads $g^3$ on the end of the screw-shafts G G, the blocks being held in place by plates $h'$, similar to the plates $e^{10}$.

It will be noticed that the screw-threads $g^3$ are one-half the pitch of the screw-threads $g$, so that the boxes $H^2$, carrying the guides H H, will move only one-half the distance of the frame $E^3$ and its roll $E'$. Thus no matter to what extent the roll $E'$ is moved away from the roll $D'$ the guides H H will always assume a central position. This construction enables a quick adjustment of the rolls and without further manipulation of the guides, saving considerable time in the adjustment of the roll for different-sized tubes.

We preferably adjust the guides H H toward and from each other by means of a handled screw-bolt $h^2$, which is carried by bars $H'$. This screw-bolt passes through a nut $b^3$ in the cavity in the boxes $H^2$, so that when the screw-bolt is turned the bar is moved toward and from the center of the machine. This construction is clearly illustrated in Figs. 6 and 8 and enables us to bore plain holes for the bars and the bolts and to use ordinary nuts, saving considerable expense in manufacture.

In order to hold the frame E, as well as the boxes $H^2$, to the standards $B'$ after adjustment, we provide clamps for each box $H^2$ and also for the four corners of the frame $E^3$. These clamps each consist of a bolt $j$, which passes through an opening in the frame or the box, as clearly illustrated in Figs. 6 and 8, and mounted on the end of this bolt is a bearing-block $j'$, which bears directly against the standard $B'$, and in the cavity in the box or frame is a nut $j^2$, through which the bolt passes, so that on turning the bolt the block can be forced tightly against the standard, thus locking the parts together, or can be backed off, so as to allow the frame and the several boxes to be raised and lowered.

In order to counterbalance the frame $E^3$ and the mechanism carried thereby, including the upper roll $E'$, we mount upon the upper plate B² two uprights I I, and on the upper ends of these uprights we pivot levers i i, the short arms of each lever being connected by rods i' to the frame E³, while suspended from the long arm of each lever is a weight i², the weight being sufficient to overbalance the frame E and the mechanism carried by it, so that the screws are relieved of all lost motion and also of considerable strain when adjustment is necessary. Consequently all chatter of the screws is overcome while in operation, and one man can readily adjust the rolls. Springs may be substituted for the weights, if desired.

It will be noticed in referring to Fig. 4 that each roll-shaft D² and E² has a keyway cut in each end, so that the driving mechanism can be coupled to either end of either shaft.

In Figs. 1 and 2 we have shown one form of driving mechanism which may be used and consists of any suitable prime mover, such as an engine M, which is geared to a transverse shaft M', having bevel-gears m m at each end, which mesh with bevel-wheels n n on shaft N N'. The shaft N is mounted in suitable bearings n' on the foundation-plate, and a connecting-shaft N² is coupled at one end by a universal joint and at the opposite end to a shaft D², carrying the roll D'.

The universal joints can be coupled to or removed from the end of the shaft D², so that the entire straightening-machine can be reversed when desired.

It will be understood that both rolls turn in the same direction and in a direction opposite to that of the tube. Therefore the shaft N' is geared to a shaft N³ by gearing n² n², in order to give the shaft N³ the proper direction and to elevate it to the average working center of the roll E', which is driven by it. The shafts N' and N³ are mounted in suitable bearings n⁴, carried by a foundation-plate, and a coupling-shaft N⁴ is coupled to the shaft N³ and to the shaft E², carrying the roll E', by universal couplings. (Shown clearly in Figs. 1 and 2.)

K is a trough used for guiding the tubes from the mill to the straightening-rolls, and K' is a trough to receive the tubes after they pass from the straightening-rolls. Any suitable mechanism may, however, be used in place of these troughs for supporting the tubes at each end of the machine.

It will be noticed in referring to the drawings that the rolls D' and E' have a greater diameter at the ends than at the center and that the surface of each roll is gradually curved from one point to the other. This form of roll is old. The guide-plates H H are also curved, as shown, so that their full length will bear upon the tube or bar, keeping the tube or bar at the proper point between the straightening-rolls.

In Fig. 9 we have illustrated a modification in which two standards B³ are used in place of the four standards shown in Fig. 6, and these standards are quadrangular in the present instance, and the bearings for the sliding plate and the supports for the guides fit these columns. The bearings may be extended so as to avoid any tilting of the parts. In this instance a single shaft is geared to the screws in each standard. The screws may in some instances be at one side of the standard without departing from the main feature of the invention.

It will be understood that while we have shown springs for overbalancing the parts and also springs for counterbalancing the lower plate levers may be used instead of the springs, and these levers may be either provided with weights or springs, or pressure-cylinders may be used, if desired.

In all mechanism there is a certain amount of lost motion, causing more or less chatter—such, for instance, as the bearings, the screws and nuts, and other movable parts of the machine. In a tube or bar straightening machine this is fatal, as any unevenness in the working of the parts causes a flattening or uneven finish of the tube or bar; but by using the springs or levers which overbalance the parts connected to the upper roll this objection is entirely overcome, as the machine is so designed that all mechanism connected with the lower roll is held down onto the bedplate and all mechanism connected to the upper roll is drawn upward by the springs or levers, as described above.

The operation of the machine is as follows: The machine is set in the first place for a certain diameter of tube—for instance, by manipulating the screws so as to adjust one roll in respect to the other—and after all the adjustments are made the rolls are set in motion and the tubes after they leave the welding-rolls, and preferably while still hot, are passed through the machine in the direction of the arrow, Fig. 2, and, as indicated in Fig. 4, the rolls, owing to their peculiar shape, bear upon the tube their full length, and as the rolls are driven the tube is rotated and is fed slowly forward, the guide-plates H H bearing upon the tube at each side, keeping the tube in proper position in respect to the rolls, and as the tube slowly passes through the machine any unevenness or kinks in the tube are removed, and the tube passes out of the machine perfectly straight.

While the machine is compact, yet every part of the same is readily accessible for adjustment.

It has been found in practice that rolls of this type wear away at one end more quickly than at the other. Consequently in order to economize in the use of this machine they should be reversed occasionally, so that the reduction of the rolls will be even throughout; but owing to the character of previous machines it has been difficult to make this adjustment without dismantling the entire machine; but we are enabled to reverse the rolls end for end when we find that one is wearing slightly more than another by simply detaching the couplings from the ends of the shafts D' and D², loosening the confining-bolts b', and owing to the spring-support of the bed-plate the entire structure can be readily turned upon the pivot and the opposite ends of the shafts D² and E² coupled to the driving mechanism.

We claim—

1. The combination in a tube or bar straightening machine, of a base, a bed mounted thereon and arranged to be turned end for end, two straightening-rolls carried by the bed, and means whereby either end of the straightening-rolls can be coupled to the driving mechanism, substantially as described.

2. The combination in a tube or bar straightening machine, of a base, a bed pivoted thereto so that it can be turned end for end, two rolls carried by the bed, and means by which driving mechanism can be coupled to either end of the straightening-rolls, substantially as described.

3. The combination in a tube or bar straightening machine, of a base, a bed pivoted to the base, means for securing the bed to the base, a saddle adjustably mounted on the bed, a lower roll carried by the saddle, standards, a frame adjustable on said standards, an upper saddle carried by said frame, and a roll carried by said saddle, with means for coupling either end of the rolls to the driving mechanism, substantially as described.

4. The combination in a tube or bar straightening machine, of a base, a bed-plate mounted thereon, rolls carried by the bed-plate, with a spring for supporting the bed-plate so that the bed-plate and the mechanism carried thereby can be turned end for end, substantially as described.

5. The combination of a base-plate, a bed mounted on the base-plate, a central pivot carried by the base and extending into the bed-plate, a spring for supporting said pivot tending to counterbalance the weight of the bed and the mechanism carried thereby, and rolls mounted on the bed-plate, the rolls being so arranged that when the bed-plate is turned end for end the rolls can be coupled to the driving mechanism, substantially as described.

6. The combination of a base-plate, a bed-plate mounted thereon, a pivot for the bed-plate, means for securing the bed-plate in its adjusted position, standards projecting from the bed-plate, a top plate secured to the upper end of the standards, a saddle pivoted to the bed-plate, means for securing the saddle in the position to which it is adjusted, a straightening-roll carried by the saddle, an upper frame mounted on the standards, an upper saddle adjustably mounted on said frame, a straightening-roll carried by the said saddle, and means for raising and lowering the said frame carrying the upper roll, substantially as described.

7. The combination of a base, a bed-plate pivotally mounted thereon, four standards mounted on the bed-plate, a lower saddle pivoted to the bed-plate, means for locking the saddle to the bed-plate when in the position to which it is adjusted, a frame mounted on the standards, a saddle pivoted to the frame, each saddle having bearings, rolls carried by the bearings, adjusting-screws mounted in the standards engaging nuts carried by the frame, and means for turning the adjusting-screws in unison, substantially as described.

8. The combination of a base, a bed-plate pivoted thereon, standards mounted on the bed-plate, a lower roll carried by the bed-plate, an upper roll, a saddle for the upper roll, a frame to which the saddle is pivoted, and a spring mounted between the pivot and the frame, counterbalancing the weight of the saddle and the roll, substantially as described.

9. The combination of a base, a bed, standards on said bed, upper and lower straightening-rolls, boxes for the upper rolls, caps for the boxes, and springs connected to the caps acting to counterbalance the weight of the upper roll, substantially as described.

10. The combination of a base, a bed-plate mounted thereon, standards on the bed-plate, a lower roll mounted on the bed-plate, an upper roll, a saddle having boxes for the upper roll, caps for the boxes, a frame mounted on the standards and carrying the saddle, rods extending from the caps through the boxes, and springs mounted between the ends of the rods and the saddle tending to counterbalance the weight of the roll, substantially as described.

11. The combination in a tube-straightening machine, of a bed, standards thereon, a frame arranged to travel on the standards, a lower roll mounted on the bed, an upper roll carried by the frame, tube-guides mounted between the upper and lower rolls, screws for simultaneously adjusting the frame and the tube-guides, the screws having threaded sections of different pitch so that the tube-guides will be adjusted one-half the distance of the adjustment of the upper roll, substantially as described.

12. The combination in a tube or bar straightening machine, of a bed-plate, a saddle pivoted thereon, means for securing the saddle in the adjusted position, standards carried by the bed-plate, a frame arranged to slide on the standards, a saddle pivoted to the frame, a roll carried by each saddle, screw-shafts mounted in each standard, means by which the screw-shafts are geared together, nuts carried by the frame, and means for counterbalancing the weight of the frame and the mechanism carried thereby, substantially as described.

13. The combination of a base-plate, a bed-plate pivoted thereto, means for securing the bed-plate to the base-plate, a spring for taking the weight of the bed-plate, a saddle pivoted to the bed-plate, a roll mounted in the saddle, standards projecting from the bed-plate, a frame mounted on the standards, an upper saddle carried by the frame, a roll mounted in bearings carried by the saddle, springs tending to draw the caps of the bearings toward the saddle, a spring tending to draw the saddle toward the frame, counterbalance mechanism for the said frame, lifting-screws, nuts on the frame with which the lifting-screws engage, and means for turning the lifting-screws, substantially as described.

14. The combination in a machine for straightening tubes or bars, of a base-plate, a pivot-pin mounted therein and carried by a plate, a spring mounted under the plate, a bed-plate mounted on the projecting portion of the pivot and having an abutment for the pivot, with straightening-rolls carried by the bed-plate, whereby the bed-plate with the straightening-rolls can be turned end for end on the pivot, the spring tending to counterbalance the weight of the mechanism, substantially as described.

15. The combination in a tube or bar straightening machine, of a base-plate, a bed-plate pivoted thereto, standards projecting from the bed-plate, a saddle pivoted to the bed-plate, a lower roll carried by the saddle, the pivot-pin of the saddle forming the abutment for the pivot-pin of the bed-plate, a spring carrying the pivot-pin and tending to counterbalance the weight of the mechanism mounted on the bed-plate, an upper roll, and means for adjusting the upper roll, substantially as described.

16. The combination of a base-plate, a bed-plate mounted thereon, a lower saddle pivoted to the bed-plate, a roll mounted in boxes carried by the said saddle, standards projecting from the bed-plate, a frame adjustably mounted on the standards, an upper saddle pivoted to the frame, an upper roll mounted in boxes carried by the saddle, a spring for counterbalancing the weight of the saddle and the weight of the roll, mechanism for counterbalancing the frame, vertical lifting-screws each having two distinct threads, one thread double the pitch of the other, nuts on the frame meshing with the steep-pitch thread, guide-plates on the frame, boxes carrying the guide-plates and each box having a nut meshing with the other thread of the lifting-screw, so that when the lifting-screws are turned the guide-plates will move one-half the distance of the upper roll and its frame, substantially as described.

In testimony whereof we have signed our names to this specification in the presence of two subscribing witnesses.

JOHN S. WORTH.
WILLIAM F. HARRISON.

Witnesses:
WILLIAM S. G. COOK,
S. G. COOK.